Figure 2:
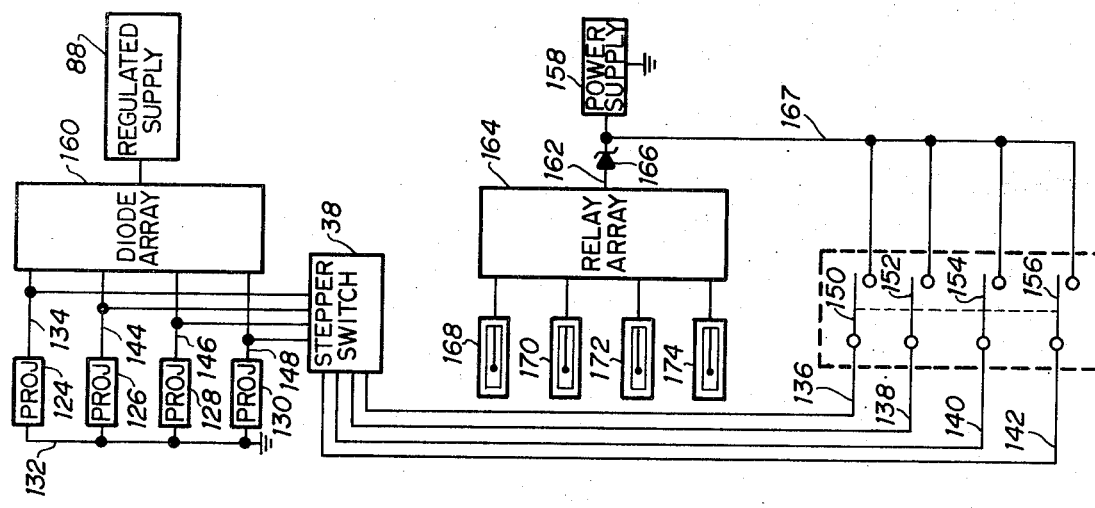

United States Patent [19]
Kraemer

[11] 3,826,871
[45] July 30, 1974

[54] APPARATUS FOR PREFERENCE TESTING

[76] Inventor: Delmar R. Kraemer, 827 Greenwood, Denton, Tex. 76201

[22] Filed: Feb. 5, 1973

[21] Appl. No.: 329,423

[52] U.S. Cl.................. 179/1 B, 179/2 AS, 35/9 R
[51] Int. Cl............................................. G09b 5/02
[58] Field of Search....... 179/1 B, 2 AS, 1 SW, 1 N, 179/1 B; 35/9 R, 22 R

[56] References Cited
UNITED STATES PATENTS
2,957,046 10/1960 Freeman et al.................. 179/2 AS
3,502,813 3/1970 Walker............................ 179/2 AS Primary Examiner—Kathleen H. Claffy
Assistant Examiner—Joseph A. Popek
Attorney, Agent, or Firm—Richards, Harris & Medlock

[57] ABSTRACT

Apparatus for investigating and recording a testee's interest in one of a plurality of audio and/or visual presentations wherein each presentation is generated by a separate source connected to one of a plurality of communication lines that also connects to one output of a multiple output power source. each output of the power source is at a different voltage level such that each communication line has a distinct voltage applied thereto from the power source. A scrambling switch randomly interconnects the communication lines with a like number of output lines such that the presentations appear on each of the output lines in a random pattern. A testee selects a preference by actuating a push-button that couples his selection to an audio and/or visual display. A plurality of time recorders, one for each output line and individually responsive to one voltage level from the power source, records the amount of time a particular presentation is coupled to the display.

15 Claims, 2 Drawing Figures

APPARATUS FOR PREFERENCE TESTING

This invention relates to preference selection evaluation, and more particularly to preference selection and recording.

Heretofore, to evaluate a viewer's preference, opinion research studies have been conducted in which an interrogator sends various questions to be answered to individual testees, who may be selected at random or systematically from the population in general. Some attempts have been made to utilize testing apparatus, but in most cases this has met with limited success due primarily to the complicated manipulations required of the testee to select his preference from one of a multiple of presentations. A further shortcoming of the few attempts made to mechanize preference evaluation has been the difficulty in accurately evaluating the results. Considerable interpretation of the results was required to determine if a testee actually selected his preference or merely found it too difficult to change a presentation to one he preferred.

Tests of the type conducted on apparatus of the present invention may also be employed for the purpose of ascertaining for what vocations or lines of endeavor the individuals tested are best suited, that is, to determine the psychological variables, comprising the attitudes, interests or personality traits of an individual for various pursuits or occupations. Again, such tests have often been conducted using multiple choice question forms wherein the subject tested selected a preference by completing an answer sheet.

Still another area of utilization of the preference selection apparatus of the present invention is for advertising purposes wherein it is desirable to obtain a reasonably accurate indication of program popularity. Advantageously, such an indication should be registered in a continuous manner which is capable of being analyzed directly in a simple, convenient and economical way without delay. Preferably the indications should be such that an advertiser, if he so wishes, may observe the measurement of program popularity simultaneously with the presentation of program matter in which he is interested.

A feature of the present invention is to provide program preference recording apparatus providing uncomplicated operation requirements to a test subject. Another feature of the present invention is to provide apparatus for program preference selection wherein the test results are immediately and continuously recorded for prompt evaluation. Another feature of the present invention is to provide apparatus for program selection wherein the test is continuously monitored for program selection and the results available during the test cycle. Further features are implicit in the detailed description which follows (which is to be considered as exemplary of, but not specifically limiting, the present invention), and said features will be apparent to persons skilled in the art after a study of the detailed description which follows.

In accordance with one embodiment of the invention, apparatus for evaluating the preference selection of randomly presented audio and/or visual wave signals comprises a plurality of information sources each providing a distinctive wave signal to an individual communication line. Coupled to all the communication lines is a scrambling switch for randomly interconnecting the lines to a plurality of output lines. A power source having multiple outputs equal in number to the number of communication lines and individually connected thereto provides a different voltage level at each source output and thus generates a different voltage level on each communication line containing a distinctive wave signal. Push-button selection switches are connected to the output lines for interconnecting a preferred information source to an audio and/or visual display available to the testee. A plurality of recorders are connected to the output lines and respond to the voltage level applied thereto from the power source to provide a continuous recording of the preference selection by the testee.

A more complete understanding of the invention and its advantages will be apparent from the specification and claims and from the accompanying drawings illustrative of the invention.

Figure 1:
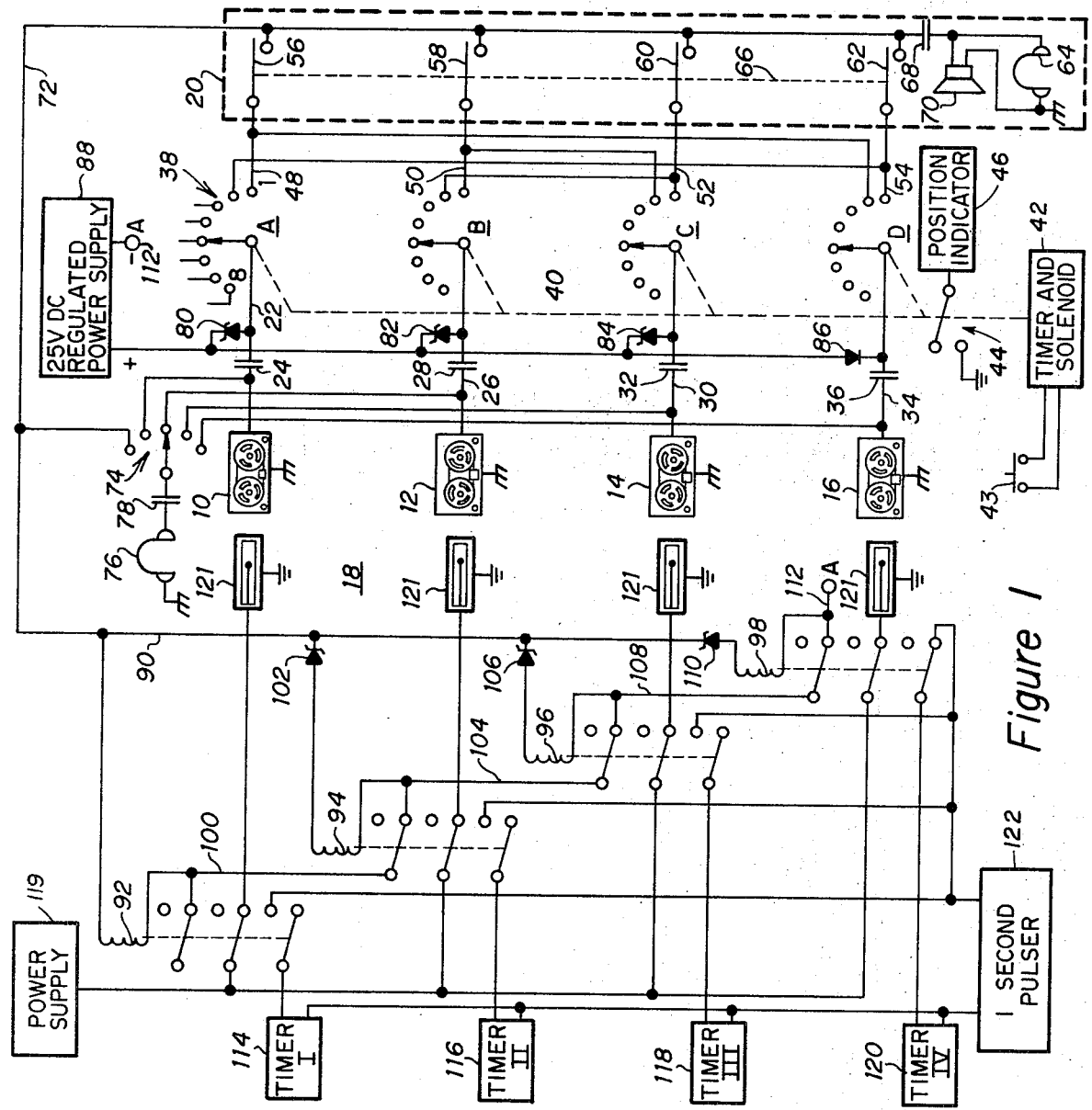

Referring to the drawings:

FIG. 1 is a schematic of audio program preference selection apparatus utilizing a stepping switch scrambler and voltage selective operated relays controlling timer recorders; and FIG. 2 is a block diagram of visual program preference selection apparatus utilizing strip chart recorders for maintaining a continuous record of a testee's selection.

Referring to FIG. 1, there is shown schematically apparatus for determining a testee's preference to one of four audio programs as provided by tape decks 10, 12, 14 and 16. The equipment identified generally within the reference number 18 is available to the test proctor and the equipment within the outline 20 is available to the party being tested. It should be understood that the invention is not limited to only four channels, additional channels are added by expanding each channel circuit to be described, and utilizing a higher voltage supply.

Audio signals from the tape deck 10 are coupled to a communication line 22 through an isolation capacitor 24 for blocking a DC voltage applied to the line 22 from being fed back into the transmitter of the tape deck. The tape deck 12 is coupled to a communication line 26 through an isolation capacitor 28 performing the same function as the capacitor 24. An audio signal from the tape deck 14 is coupled to a communication line 30 through an isolation capacitor 32 and the tape deck 16 is coupled to a communication line 34 through an isolation capacitor 36. Each of the isolation capacitors performs the same function as described with reference to the capacitor 24.

In addition to audio tape information sources as illustrated, other audio signal generators may be coupled to the communication lines 22, 26, 30 and 34 to provide information to be selected by the testee in the order of preference. The programs presented may be musical, educational or news sources, as examples, and for certain psychological testing various tone generators are coupled to the communication lines.

Each of the communication lines 22, 26, 30 and 34 is individually connected to a wiper arm of one deck of a multiple deck stepping switch 38. As illustrated, each deck of the stepping switch 38 has 12 positions starting with position No. 1 at the far right and increasing counterclockwise to position No. 12. The wiper arms for all four decks of the switch 38 move in synchronism to the various positions by means of a mechanical linkage 40 coupled to a timer and solenoid driver 42. The timer and solenoid driver 42 comprise a clock operated switch having selected open and closed intervals for energizing a solenoid to operate the mechanical linkage 40 and thereby position the wiper arms of each deck of the switch 38. Each time the solenoid of the driver 42 is energized the wiper arms move to the next position. In addition to energizing the solenoid of the driver 42 by means of a clock operated switch, a push-button 43 is connected in parallel to the clock switch to enable manual advancing of the switch 38 at intervals other than established by the driver clock. The switch 43 also enables the rapid resetting of the system upon completion of a test sequence.

Also operatively connected to the mechanical linkage 40 is a cam operated switch 44 that is programmed to close when the wiper arms are in the 12 position. Closing the switch 44 energizes a position indicator 46 to signal the test proctor that a complete scrambling sequence has taken place and upon the next energization of the timer and solenoid driver 42 the wiper arms of the switch 38 will be in the initial position.

The terminal of position No. 1 of deck A of the switch 38 is connected to an output line 48 which also connects to the second position terminal of the switch deck D. The first position terminal of deck B connects to an output line 50 which also connects to the terminal of position No. 2 of deck C. For the deck C, the first position terminal connects to an output line 52 which also connects to the second position terminal of the deck B. The first position terminal of the deck D connects to an output line 54 which is also connected to the second position terminal of the deck A. Thus, each of the output lines is illustrated connected to three terminal positions of different decks of the switch 38.

To provide for a random application of the information on the communication lines 22, 26, 30 and 34 to the output lines 48, 50, 52 and 54 each of the twelve positions of each deck of the stepping switch 38 connects to one of the output lines in an arrangement such that with 12 terminal positions each deck connects to an output line three times in a complete sequence of the test procedure. Rather than confuse the drawing by showing the various interconnections of the position terminals to the output lines, only the first two positions have been illustrated. As a typical example of an interconnection network reference is made to Table I wherein the connection for each of the four decks of the switch 38 and each terminal position thereof is given for the output lines 48, 50, 52 and 54.

TABLE I

| Deck Position | Output Lines | | | |
|---|---|---|---|---|
| | A | B | C | D |
| 1 | 48 | 50 | 52 | 54 |
| 2 | 54 | 52 | 50 | 48 |
| 3 | 50 | 48 | 54 | 52 |
| 4 | 48 | 54 | 52 | 50 |
| 5 | 52 | 48 | 50 | 54 |
| 6 | 50 | 54 | 48 | 52 |
| 7 | 54 | 50 | 52 | 48 |
| 8 | 52 | 48 | 54 | 50 |
| 9 | 50 | 52 | 48 | 54 |
| 10 | 48 | 50 | 54 | 52 |
| 11 | 52 | 54 | 50 | 48 |
| 12 | 54 | 52 | 48 | 50 |

Without knowledge of the interconnection as given in Table I, a testee cannot foretell which of the tape decks 10, 12, 14 or 16 will be connected to a particular output line. To select a particular program, he actuates one of the push-button switches 56, 58, 60 or 62. When the testee closes one of these switches, he connects one of the audio programs to a headset 64 thereby enabling him to listen to a selected program. If the program he has selected is not to his liking, he actuates another of the push-button switches 56, 58, 60 or 62. These switches are interconnected by means of a mechanical linkage 66 such that the closure of one automatically releases and opens the remaining three.

To isolate a DC voltage on the output line coupled to the closed push-button switch from the headset 64, an isolation capacitor 68 is connected in the line to the headset. The capacitor 68 performs the same function as the ioslation capacitor 24, described previously. As an alternate to the headset 64, the program selected by the testee is broadcast from a speaker 70 connected in parallel with the headset 64 or tape recorder replaces the speaker 70 to record the program material selected by the testee.

To allow the test proctor to monitor the testee's selection, a line 72 is connected to the common terminal of the push-button switches and leads to a five position switch 74. The other four terminal positions of the switch 74 are individually connected to one of the communication lines. The wiper arm of the switch 74 is connected to a headset 76 through an isolation capacitor 78. The isolation capacitor 78 functions in the same manner as the capacitor 24. The headset 76 is worn by the test proctor and by operation of the switch 74 he may monitor the programs presented by the tape decks 10, 12, 14 or 16 and the selection made by the testee.

To record the selections by the testee, distinct DC voltages are applied to each of the communication lines 22, 26, 30 and 34. The different voltages are generated by connecting diodes 80, 82, 84 and 86 to the output of a regulated DC power supply 88. The diodes 80, 82 and 84 are Zener diodes for establishing the different voltage levels on each of the respective communication lines 22, 26 and 30. The diode 86 is a blocking diode and the full output of the power supply 88 is applied to the communication line 34.

As an example of a voltage distribution as applied to the communication lines, the power supply 88 generates 25 volts at the output terminal and this is applied through the diode 86 to the communication line 34. The diode 84 has a conduction level of 5.6 volts resulting in approximately 18 volts being applied to the communication line 30. The Zener diode 82 conducts at 12 volts and this provides a voltage of approximately 12 volts to the communication line 26. For the communication line 22, the Zener diode 80 conducts at 18 volts and produces a voltage of approximately 6 volts applied to the line. Thus, in this example, a 6 volt potential is applied to the communication line 22, a 12 volt potential is applied to the communication line 26, an 18 volt potential is applied to the communication line 30 and a 25 volt potential is applied to the communication line 34. These voltages are transmitted through the various decks of the stepping switch 38 to the output lines 48, 50, 52 and 54. When the testee closes one of the push-button switches 56, 58, 60 or 62 the DC voltage on the output line connected to that switch appears on a recording line 90.

The recording line 90 connects to a time recorder network including relays 92, 94, 96 and 98. Each of the relays controls a three-pole, two-position contact switch through a mechanical linkage. Referring specifically to the relay 92, the coil thereof connects directly to the line 90 at one terminal and at the second terminal connects to a line 100 also tied to one switch controlled by the relay 94. The coil of the relay 94 connects to the line 90 through a Zener diode 102 and has a second terminal to a line 104. Also connected to the line 104 is one of the contact switches of the relay 96. A Zener diode 106 is connected between the coil for the relay 96 and the line 90. The second terminal of the coil for relay 96 connects to a line 108 that also is tied to one of the contact switches of the relay 98. The coil of the relay 98 is connected to the line 90 through a Zener diode 110 and also connects to a return line 112 for the power supply 88.

Each of the Zener diodes 102, 106 and 110 conducts at a different voltage level to selectively control the energization of the relay coil associated therewith. For the voltage ratings given previously for the Zener diodes 80, 82 and 84, the Zener diode 102 has a voltage rating of 6.2 volts, the Zener diode 106 has a voltage rating of 12 volts and the Zener diode 110 has a voltage rating of 18.2 volts. By use of Zener diodes to conduct at various voltage levels and by the interconnection of the relay coils through the lines 100, 104 and 108, only one of the relays in the time recorder network is energized at any one time during a testing sequence.

As mentioned, each of the relays operates a three-pole, two position contact switch. For the relay 92, the second contact switch controlled thereby connects to a timer 114. The second contact switch of the relay 94 connects to a timer 116, the second contact switch of the relay 96 controls a timer 118 and the second contact switch of the relay 98 connects to a timer 120. Each of the timers 114, 116, 118 and 120 has a common connection to a pulser network 122. A second output line of the pulser network 122 connects to one terminal of each of the contact switches connected to one of the timers. The pulser network 122 generates a series of pulses on the output lines thereof for energizing the timers 114, 116, 118 or 120 as connected to the network 122. Typical circuitry for the network 122 is illustrated in the RCA Solid State Hobby Circuit Manual, Technical Serial HM-91, on Page 232.

Typically, the third contact switch of each of the relays 92, 94, 96 and 98 controls the operation of a strip chart recorder 121 as connected to a power source 119. This third contact may also be used to close another set of relays that in turn controls lights for additional visual displays, start and stop video tape recorders, projectors, etc.; or if the time measurement must be extremely accurate, energize digital clocks for each channel. The projectors are operated either independently without the tape decks 10, 12, 14 and 16 or in conjunction therewith.

In operation of the apparatus of FIG. 1, the test proctor connects each of the tape decks 10, 12, 14 and 16 to the respective communication lines and starts the timer and solenoid driver 42. Depending on the position of the stepping switch 38, the audio programs from the tape decks are randomly connected to one of the output lines 48, 50, 52 and 54. The test subject actuates one of the push-button switches 56, 58, 60 or 62 to connect the program on a particular output line to the headset 64. By closing one of the push-button switches the testee also causes one of the DC voltage outputs of the power supply 88 to be connected to the monitor line 90. Depending on the voltage level on the line 90, one of the relays 92, 94, 96 or 98 will be energized thereby connecting the respective timer to the pulser network 122. That timer then produces a running count of the number of pulses generated by the network 122 during the time interval that a particular relay is closed.

As an example, assume that the stepping switch 38 is in the first position and the test subject closes the push-button switch 58, then the voltage on the monitor line 90 is 12 volts as established by the Zener diode 82. This 12 volt potential is applied to the relay 92 which should be energized through the closed contact of the relay 94. However, a 12 volt potential on the monitor line 90 causes conduction through the 6.2 volt Zener diode 102 thereby energizing the relay 94. Energizing the relay 94 opens the contact between the line 100 and the line 104 thereby preventing energization of the relay 92. The relay 94 will be energized by a path from the line 104 to the line 108 and to the return line 112 through the closed contacts of the relays 96 and 98, respectively. Energizing the relay 94 also closes the contact switch for the timer 116 and it is connected to the network 122 to record pulses generated thereby.

Instead of closing the push-button switch 58, assume that the testee closes the push-button switch 60 with the stepping switch 38 still in the first position, then the voltage level on the monitor line 90 will be 18 volts as established by the Zener diode 84. An 18 volt potential on the line 90 is insufficient to cause conduction through either the Zener diode 110, thereby preventing energization of the relay 98. However, the relay 96 is energized through the line 108 and a closed contact to the return line 112. The timer 118 is now connected to the pulser network 122 to record pulses generated thereby. Thus, the amount of pulses recorded in each of the timers 114, 116, 118 or 120 depends on the duration of a particular voltage level on the line 90.

Typically, the timer and solenoid driver 42 steps the switch 38 to the next position at five minute intervals. If the push-button switch 60 has been closed by the test subject when the switch 38 changes from position No. 1 to position No. 2 then the communication line 26 will be connected to the output line 52. The voltage on the monitor line 90 will be 12 volts as established by the Zener diode 82. As explained, the relay 94 is then energized to connect the timer 116 to the pulser network 122.

If the test subject wants to continue to listen to the program as previously appearing on the communication line 30, he must then actuate the push-button switches until he finds the program he desires. At any time, the test subject may also change from one program selection to another by operating the push-button switches. Whenever he operates a push-button switch, the voltage on the monitor line 90 changes, thereby de-energizing one of the relays in the time recorder network and energizing a different relay.

Following is a list of components for one implementation of the circuit of FIG. 1:

| | |
|---|---|
| Capacitors 24, 28 32 and 36 | 500 µf, 35 VDC |
| Capacitor 68 | 0.1 µf, 35 VDC |
| Capacitor 78 | 100 µf, 35 VDC |

| | |
|---|---|
| Zener diode 80 | 18 volts |
| Zener diodes 82 and 106 | 12 volts |
| Zener diode 84 | 5.6 volts |
| Zener diode 102 | 6.2 volts |
| Zener diode 110 | 18.2 volts |
| Stepping switch 38 | 4 decks, 20 positions, manufactured by C. P. Clare, Model No. 20-11004A |
| Relays 92, 94, 96 and 98 | Three-pole, double-throw manufactured by Potter & Brumfield, Model No. KA14DY |
| Timers 114, 116, 118 and 120 | 60 Hz counters, manufactured by General Controls, Model No. CE900BS602 |
| Switch 74 | 5 position rotary |

Referring to FIG. 2, there is shown an alternate embodiment of the invention wherein the testee views visual displays as presented by one of the projectors 124, 126, 128 or 130. Each of the projectors has a common connection to ground through a line 132. The projector 124 connects to a communication line 134 and through the stepping switch 38 to one of the output lines 136, 138, 140 or 142, in accordance with the position of the stepper switch. The projector 126 connects to a communication line 144 and through the stepper switch 38 to one of the lines 136, 138, 140 or 142. Projectors 128 and 130 respectively connect to communication lines 146 and 148 and through the stepper switch 38 to the output lines. Each of the lines 136, 138, 140 and 142 is tied to one of the push-button switches 150, 152, 154 and 156. The common terminal interconnection of these switches is to one terminal of a power supply 158.

To select a particular projector to provide a visual display, the test subject operates one of the push-button switches 150, 152, 154 or 156. Depending upon the position of the stepper switch 38, as explained previously with regard to FIG. 1, one of the projectors will be connected to the power supply 158 thereby presenting a selected visual program to the test subject.

The time duration any one of the four projectors is energized will be recorded by connecting a diode array 160 to the output of the regulated supply 88, wherein the array 160 comprises the diodes 80, 82, 84 and 86 of FIG. 1. Connected to the output line of the power supply 158 is a monitor line 162 tied to the relay array 164 through a Zener diode 166. The relay array 164 comprises the relays 92, 94, 96 and 98 of FIG. 1, along with the associated Zener diodes. In the embodiment of FIG. 2, the Zener diode has a conduction level equal to that of the power supply 158 such that only the voltage on line 167 in excess of the supply voltage will be applied to the relay array 164. Each of the four outputs of the relay array 164 connects to one of the strip chart recorders 168, 170, 172 or 174.

When a test subject closes one of the push-button switches 150, 152, 154 or 156 a voltage appears on the monitor line 162 and energizes one of the relays of the array 164. The particular relay energized actuates one of the strip chart recorders to provide a permanent record of the amount of time a particular projector was energized by the test subject.

While several embodiments of the invention, together with modifications thereof, have been described in detail herein and shown in the accompanying drawings, it will be evident that various further modifications are possible without departing from the scope of the invention.

What is claimed is:

1. A system for evaluating the preference of randomly presented audio and/or visual wave signals, comprising in combination:
   a plurality of information sources each providing distinctive wave signals,
   a power source having output means equal in number to the number of information sources, each of said output means providing a different voltage potential,
   scrambling means for randomly interconnecting the individual output means to a plurality of output lines,
   a plurality of recorder means equal in number to the number of information sources and each recorder is identified with one of said information sources, and
   selection means connected to the output lines and responsive to the different voltage potentials of said output means for randomly interconnecting an information source to an audio and/or visual display and for actuating its associated recorder means.

2. A system as set forth in claim 1 wherein each output means of said power source includes means for generating a voltage potential at the respective output different from the voltage potential of all other output means.

3. A system as set forth in claim 2 wherein said means for generating includes a unidirectional electrical element for establishing a desired voltage potential at the output thereof.

4. A system as set forth in claim 1 wherein said selection means includes a plurality of push-button switches interconnected in a manner such that the closing of one switch opens all others.

5. A system as set forth in claim 1 wherein said selection means includes switching means equal in number to the number of information sources and responsive to a selected output means, and
   a recorder means is actuated by the closing of the respective switching means.

6. A system as set forth in claim 5 including means for interconnecting said switching means to render inoperative all switching means responsive to a lower voltage potential as generated at said power source than a closed switching means.

7. A system as set forth in claim 6 wherein said switching means includes a voltage threshold detector for selectively operating said switching means.

8. A system as set forth in claim 1 wherein said selection means includes:
   a plurality of selection switches equal in number to the plurality of information sources for randomly connecting one of said output lines to a common line, and
   switching means individually connected to the common line and selectively responsive to one of said output means to interconnect a randomly selected information source to the audio and/or visual display and for actuating its associated recorder means.

9. A system for evaluating the preference of randomly presented audio programs, comprising in combination:
- a plurality of audio sources each providing a distinctive program,
- a power source having output means equal in number to the number of audio sources, each of said output means providing a different voltage potential,
- scrambling means for randomly interconnecting the individual output means to a plurality of output lines,
- a plurality of time recorders equal in number to the number of audio sources and each recorder is identified with one of said sources,
- a plurality of selection switches equal in number to the plurality of audio sources for randomly connecting one of said output lines to a common line, and
- a plurality of switching means connected to the common line and selectively responsive to one of said output means to interconnect a randomly selected audio source to an audio transmitting means and for actuating its associated time recorders.

10. A system as set forth in claim 9 including means for interconnecting said switching means to render inoperative all switching means responsive to a lower voltage potential as generated at said power source than a closed switching means.

11. A system as set forth in claim 10 wherein said switching means each includes a voltage threshold detector for selectively operating said switching means.

12. A system as set forth in claim 9 wherein each output means of said power source includes a unidirectional electrical element for establishing a desired voltage at the respective output.

13. A system as set forth in claim 9 wherein said scrambling means includes an indicator for signaling the position of said scrambling means in a selected scrambling order.

14. A system as set forth in claim 9 including means for monitoring the audio program selected by said selection means to be applied to the audio transmitter.

15. A system as set forth in claim 9 wherein each of said recorders comprises a timer for recording the length of time a particular information source is connected to the audio transmitting means.

* * * * *